(12) United States Patent
Frayssignes et al.

(10) Patent No.: US 9,612,819 B2
(45) Date of Patent: Apr. 4, 2017

(54) SYSTEM AND METHOD FOR AUTOMATIC RELOADING OF SOFTWARE INTO EMBARKED EQUIPMENT

(71) Applicant: Airbus Operations (S.A.S.), Toulouse (FR)

(72) Inventors: Anne Frayssignes, Saint-Andre (FR); Marc Cramoisan, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/864,352

(22) Filed: Sep. 24, 2015

(65) Prior Publication Data

US 2016/0092192 A1    Mar. 31, 2016

(30) Foreign Application Priority Data

Sep. 26, 2014  (FR) ...................... 14 59125

(51) Int. Cl.
| | |
|---|---|
| *G06F 3/048* | (2013.01) |
| *G06F 9/445* | (2006.01) |
| *G06F 13/00* | (2006.01) |
| *G06F 9/44* | (2006.01) |

(52) U.S. Cl.
CPC ............ *G06F 8/61* (2013.01); *G06F 8/65* (2013.01); *G06F 9/445* (2013.01); *G06F 9/4411* (2013.01)

(58) Field of Classification Search
CPC . G06F 8/65; G06F 8/61; G06F 11/008; G06F 11/1433; G06F 8/60; G02B 27/48; G02B 19/0014; G02B 19/0085; H01S 5/02248; H01S 5/4025; H01H 83/04; H01H 71/62; H02H 3/338; G06Q 10/10; H04W 4/02
See application file for complete search history.

(56) References Cited

U.S. PATENT DOCUMENTS

| | | | |
|---|---|---|---|
| 7,510,110 | B2 | 3/2009 | Pietrzyk et al. |
| 8,543,671 | B1 | 9/2013 | Orey et al. |
| 9,098,374 | B2 * | 8/2015 | Krenz ........................ G06F 8/65 |
| 9,274,786 | B2 * | 3/2016 | Ji ............................ G01C 21/36 |

(Continued)

FOREIGN PATENT DOCUMENTS

| | | |
|---|---|---|
| EP | 1688840 A2 | 8/2006 |
| FR | 3003365 | 9/2014 |
| FR | 3004566 | 10/2014 |

OTHER PUBLICATIONS

French Search Report for Application No. 1459125 dated May 4, 2015.

*Primary Examiner* — Thuy Dao
(74) *Attorney, Agent, or Firm* — Jenkins, Wilson, Taylor & Hunt, P.A.

(57) ABSTRACT

A system and method for automating detection of a change of configuration of an embedded unit and the reloading of the appropriate software configuration into the unit. An automatic reloading system comprises a transmitter associated with the unit to transmit a configuration frame comprising a set of identifiers of the current hardware and/or software configuration of the unit, a detector to capture the configuration frame and to detect a change of hardware and/or software configuration of the unit, and a software loader to automatically reload a set of appropriate software elements into the unit according to the detected change of configuration.

8 Claims, 5 Drawing Sheets

(56) References Cited

U.S. PATENT DOCUMENTS

| | | | | |
|---|---|---|---|---|
| 9,443,358 B2* | 9/2016 | Breed | ............... | G06F 8/65 |
| 2008/0156476 A1* | 7/2008 | Smisson | ............... | A61M 5/44 |
| | | | | 165/185 |
| 2009/0174989 A1* | 7/2009 | Nagel | ............... | G08B 13/126 |
| | | | | 361/679.01 |
| 2011/0270482 A1* | 11/2011 | Holzer | ............... | G05B 19/4184 |
| | | | | 701/31.4 |
| 2012/0233495 A1* | 9/2012 | Einig | ............... | G06F 11/1658 |
| | | | | 714/4.5 |
| 2013/0024727 A1* | 1/2013 | Frayssignes | ............... | G06F 11/1004 |
| | | | | 714/16 |
| 2013/0305238 A1* | 11/2013 | Frayssignes | ............... | G06F 8/65 |
| | | | | 717/173 |
| 2013/0335197 A1* | 12/2013 | Oder | ............... | G06K 7/0008 |
| | | | | 340/10.1 |

* cited by examiner

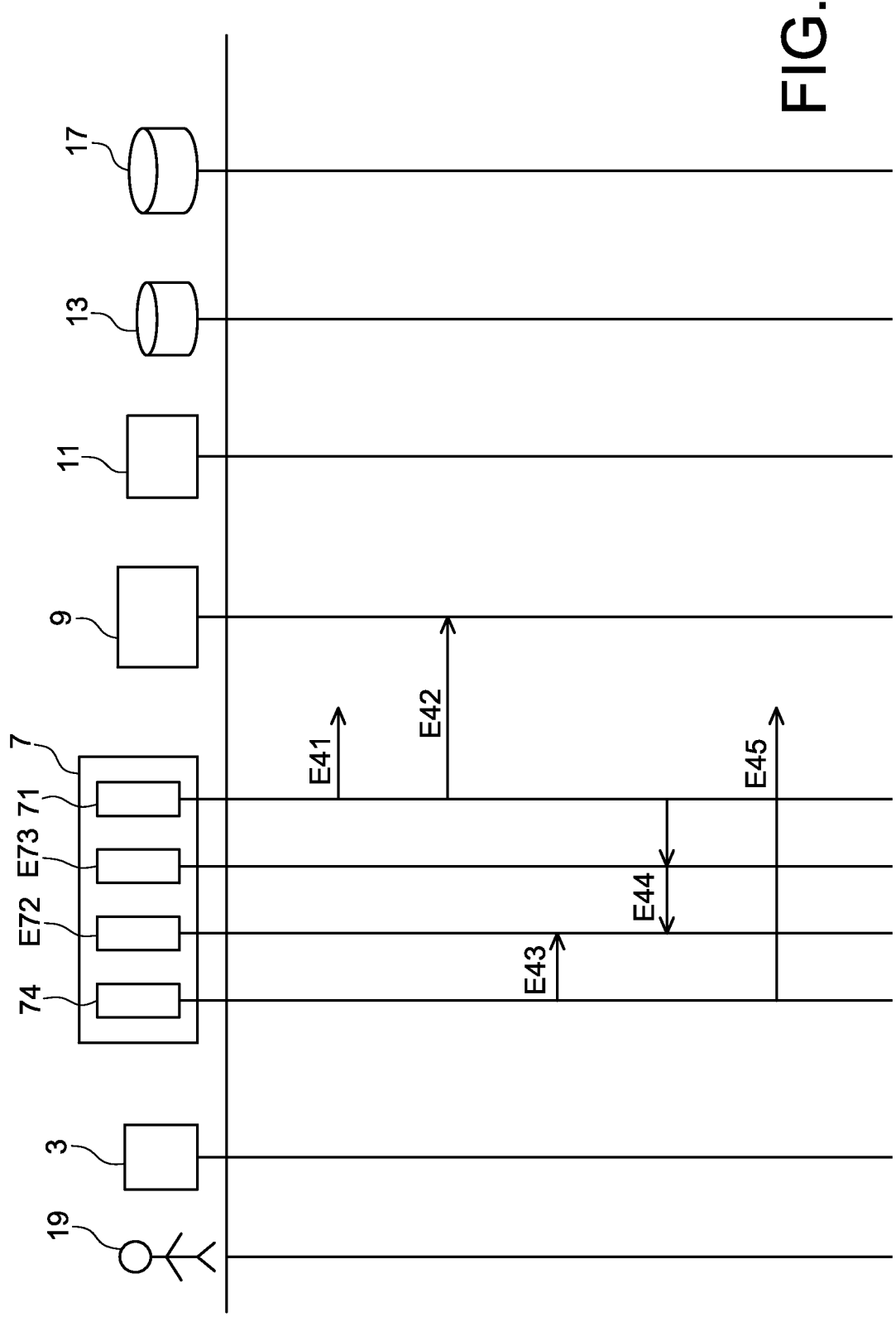

SYSTEM AND METHOD FOR AUTOMATIC RELOADING OF SOFTWARE INTO EMBARKED EQUIPMENT

CROSS-REFERENCE TO RELATED APPLICATION

This application claims priority to French Patent Application 14 59125 filed Sep. 26, 2014, the entire disclosure of which is incorporated by reference herein.

TECHNICAL FIELD

The present disclosure relates to the field of downloading, and more particularly relates to automatic reloading of software on an embedded and replaceable unit of an aircraft.

BACKGROUND

An aircraft comprises a plurality of downloadable embedded units that perform functions specific to the aircraft. These embedded units are replaceable and are generally called computers or "line replaceable units" LRU.

Currently, when an embedded unit is defective, it is dismantled from the aircraft, sent to the maintenance center to be tested and possibly repaired. The defective unit is then replaced by the repaired unit or by a new unit.

At the maintenance center, dedicated test software for testing the defective unit is installed in place of the operational software already in the unit. After the unit has been repaired, the test software is deleted and the unit is often kept blank or reloaded with minimal configuration software. Only very rarely is the operational software reinstalled in the unit because it is difficult to anticipate the software configuration that the unit will need to have when it is reinstalled in an aircraft.

In the case where the unit has not been reloaded or has been partially reloaded, the maintenance operator must perform the downloading of the missing software into the unit on board the aircraft. After having returned the unit to its receptacle, the maintenance operator must make a plurality of selections on an interface of a handheld or embedded downloading management device to select the target to be downloaded and install the appropriate software in the targeted unit. Then, he or she must check the new configuration of the unit, validate his or her actions and close his or her jobcard. All these actions take a not inconsiderable amount of time and are performed while the aircraft is immobilized, thus potentially generating delays and additional costs. Even in the very rare case where the operational software has been reinstalled in the unit, the maintenance operator must still check the configuration of the unit.

Similarly, in the case where the defective unit has to be replaced by another unit comprising none or just some of the operational software, the same actions as previously have to be performed by the maintenance operator.

Furthermore, in the case where the defective unit is replaced by an alternative non-standard unit requiring different software, the maintenance operator must make sure that the software packages are authorized, recover the corresponding software, and load them in the unit, which will therefore take even a longer time.

An object of the present disclosure is consequently to remedy the above-mentioned drawbacks by providing a method and a system for automatically reloading appropriate software on an embedded unit thus making it possible to reduce the aircraft downtime and the costs.

SUMMARY

The present disclosure aims to automate the detection of a change of configuration of an embedded unit and the reloading of the appropriate software configuration in the unit. The disclosure herein relates to a method and a system for automatically reloading software in an embedded and replaceable unit of an aircraft, the unit being reinstalled on the aircraft after having been removed and repaired or being a new unit installed on the aircraft to replace a previously removed defective unit, the system comprising:

a transmitter associated with the unit and adapted to transmit a configuration frame comprising a set of identifiers of the current hardware and/or software configuration of the unit;

a detector adapted to capture the configuration frame and to detect a change of hardware and/or software configuration of the unit; and a software loader adapted to automatically reload a set of appropriate software elements in the unit according to the detected change of configuration.

Thus, this system for automatically reloading software on an embedded unit makes it possible to reduce the time and costs involved in replacing a defective unit.

BRIEF DESCRIPTION OF THE DRAWINGS

Other particular features and benefits of the system and of the method according to the disclosure herein will emerge more clearly on reading the following description, given by way of indication but in a non-limiting manner, with reference to the attached drawings in which:

FIG. 7 schematically illustrates an example of a method for automatically reloading software in an embedded unit of an aircraft, according to the second embodiment of the disclosure herein.

DETAILED DESCRIPTION

A principle of the disclosure herein comprises automating the reloading of software on an embedded and replaceable unit of an aircraft.

Figure 1:
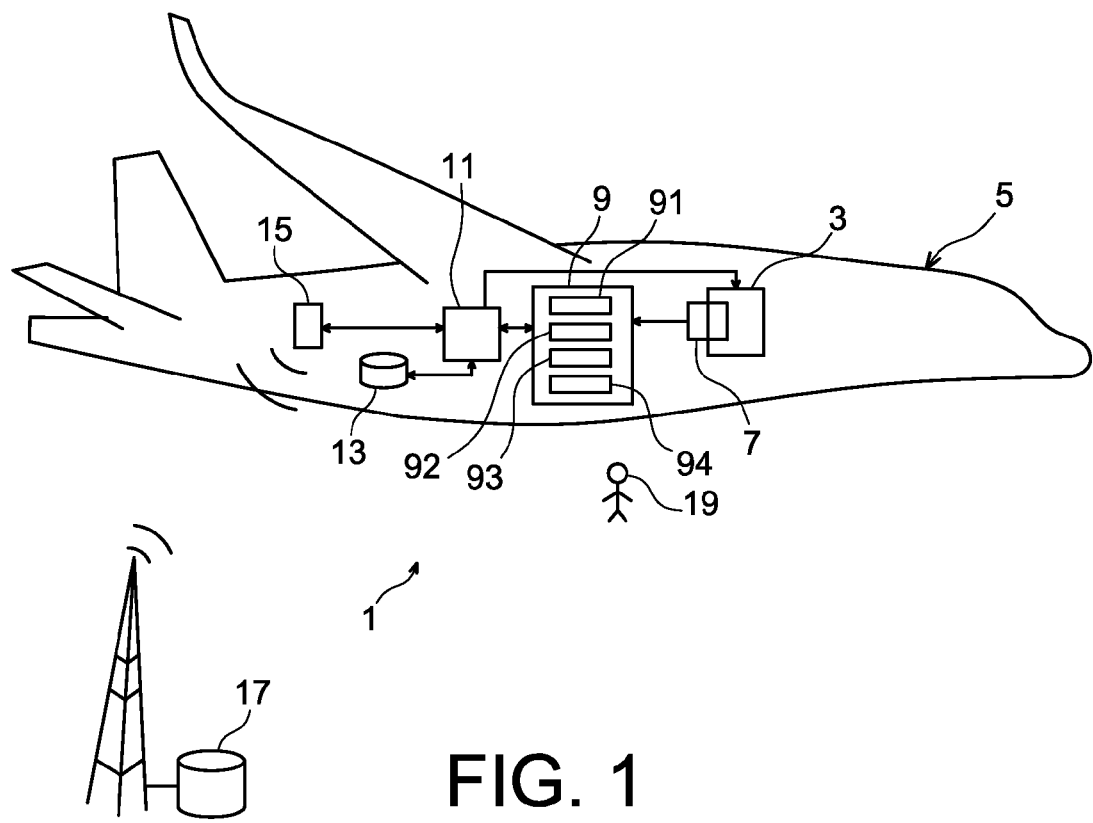
FIG. 1 schematically illustrates a system for automatically reloading software in an embedded unit of an aircraft, according to an embodiment of the disclosure herein.

FIG. 1 schematically illustrates a system 1 for automatically reloading software in an embedded unit 3 of an aircraft 5, according to an embodiment of the disclosure herein.

The embedded unit 3 is a replaceable and downloadable unit LRU of computer type (for example, a flight control computer, a hydraulic regulation computer, etc.). Each unit 3 is identified by a serial number SNR and by hardware functional identifiers, or hardware functional item numbers (HW FIN) comprising hardware part numbers HW PNR, and by software functional identifiers, or software functional item numbers SW FIN, comprising software part numbers SW PNR. Each of these identifiers is unique and unchanging. For example, each software functional identifier SW FIN is a constant uniquely and unambiguously identifying the position of a piece of embedded software on the aircraft 5. Thus, each unit 3 can be identified by a set of identifiers defining its hardware and/or software configuration.

When a unit 3 is reinstalled on the aircraft 5 after having been removed and repaired or when a new unit is installed on the aircraft to replace a previously removed defective unit, the reloading system 1 according to the disclosure herein is adapted to automatically reload the appropriate software elements missing from the unit.

In effect, in accordance with the disclosure herein, the reloading system 1 comprises hardware and/or software comprising a transmitter 7, a detector 9, and a software loader 11.

The transmitter 7 is associated with the unit 3 and can form an integral part of the unit or of its environment. It is adapted to transmit a configuration frame comprising a set of identifiers of the current hardware and/or software configuration of the unit. "Current configuration" should be understood to mean that which defines the unit 3 on the date of transmission.

The detector 9 is embedded and adapted to capture the configuration frame transmitted by the transmitter 7. The detector 9 is configured to detect any change of hardware and/or software configuration of the unit 3 thus making it possible to identify the fact that the latter has been removed then reinstalled or that the unit is new and replaces that which was installed previously.

More particularly, the detector 9 comprises a receiver 91, a comparator 92, a trigger 93 and a recorder 94.

The receiver 91 is adapted to capture each hardware and/or software configuration frame for the unit 3 transmitted by the transmitter 7.

The recorder 94 is adapted to store the identifiers of the current configuration. For example, the identifiers are recorded in an internal table describing the history of the identifiers with the date of reception of these identifiers.

The comparator 92 is adapted to compare the identifiers of the current configuration of the unit 3 with those of the preceding configuration in order to detect any change of hardware and/or software configuration of the unit.

Thus, the comparator 92 compares each current configuration frame with that received previously. If the current frame comprises the same identifiers as the preceding frame, then the comparator 92 concludes that the unit 3 has not been removed and simply updates the date of the identifiers in the internal log of the recorder 94.

On the other hand, if the current frame does not comprise identifiers and/or does not comprise some of the identifiers, then the comparator 92 concludes that the unit 3 is new (if the serial number SNR and/or hardware part numbers HW PNR have changed) or that it has been reinstalled after having been removed (if only software part numbers SW PNR have changed). In this case, the current identifiers are recorded and the trigger 93 triggers the loading of the appropriate software. In effect, the trigger 93 is adapted to transmit to the software loader 11 a trigger signal indicating, for example, the preceding and current configurations of the unit thus triggering the downloading of the set of appropriate software elements into the unit 3 according to the detected change of configuration.

Advantageously, the software loader 11 is adapted to reload the set of appropriate software elements into the unit 3 in an appropriate order.

As a variant, the software loader 11 is adapted to reload the set of appropriate software elements into the unit 3 in any order. In this case, it is the unit 3 which is configured to reorganize the set of software elements in an appropriate loading order.

Advantageously, the system 1 comprises an embedded software storage device 13 (repository). The software loader 11 is then adapted to recover the set of software elements from this embedded software storage device 13. It will be noted that, in the case where certain software elements are not included in the embedded storage device, the software loader 11 is adapted to recover, via communication devices 15, the missing elements from a software storage device or service 17 arranged on the ground.

Furthermore, in the case where the system 1 does not include any embedded software storage device 13, the software loader 11 is also adapted to recover, via the communication devices 15, the set of software elements from the software storage device 17 arranged on the ground.

Advantageously, the software loader 11 is adapted to transmit, after the reloading of the set of appropriate software elements in the unit 3, a notification to a maintenance operator 19 confirming the completion of the reloading.

Moreover, after the loading of the appropriate software elements, the unit 3 is adapted to restart automatically. After the unit has been restarted, the transmitter 7 is adapted to transmit a new configuration frame comprising the current hardware and/or software configuration identifiers.

Furthermore, the detector 9 is adapted to check that the unit 3 comprises the appropriate hardware and/or software configuration. The detector 9 is also adapted to perform a validation and a logging of the new configuration. The logging consists, for example, in storing all the new identifiers in the first line of the internal log table by shifting all the other lines.

Figure 2:
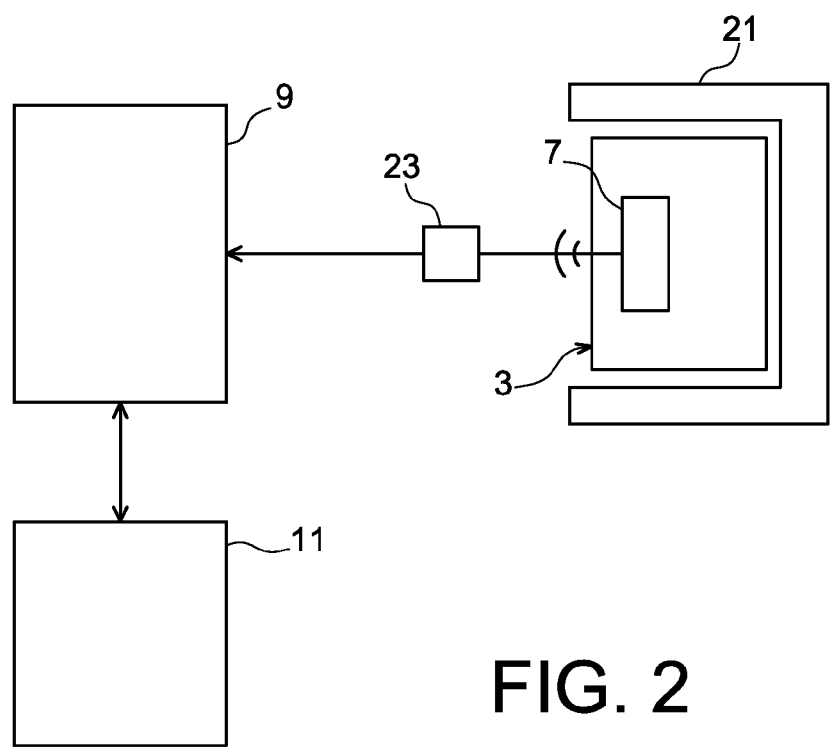
FIG. 2 schematically illustrates a system for automatically reloading software in an embedded unit of an aircraft, according to a first preferred embodiment of the disclosure herein.

FIG. 2 schematically illustrates a system for automatically reloading software in an embedded unit of an aircraft, according to a first preferred embodiment of the disclosure herein.

According to this first embodiment, the transmitter 7 is incorporated in the embedded unit 3. The transmitter 7 is for example a computer application which is implemented by the processor or the processing device of the unit 3. When the unit 3 is installed in its receptacle 21 and therefore powered, the transmitter 7 is adapted to transmit, on successive dates (for example periodically each minute), a series of configuration frames 23, each frame 23 comprising, on the date of transmission, the current hardware and/or software configuration identifiers of the unit 3.

Thus, each current frame 23 transmitted by the transmitter 7 is picked up by the detector 9 and compared to the frame previously received in order to detect any change of hardware and/or software configuration of the unit. It will be noted that, if the transmission is periodic and the detector 9 no longer receives any frames for a time longer than the transmission period, it concludes that the unit has been removed. The detector 9 awaits the reception of new frames before concluding that the unit 3 has been reconnected or that a new unit has been connected according to the identifiers included in the frame.

Figure 3:
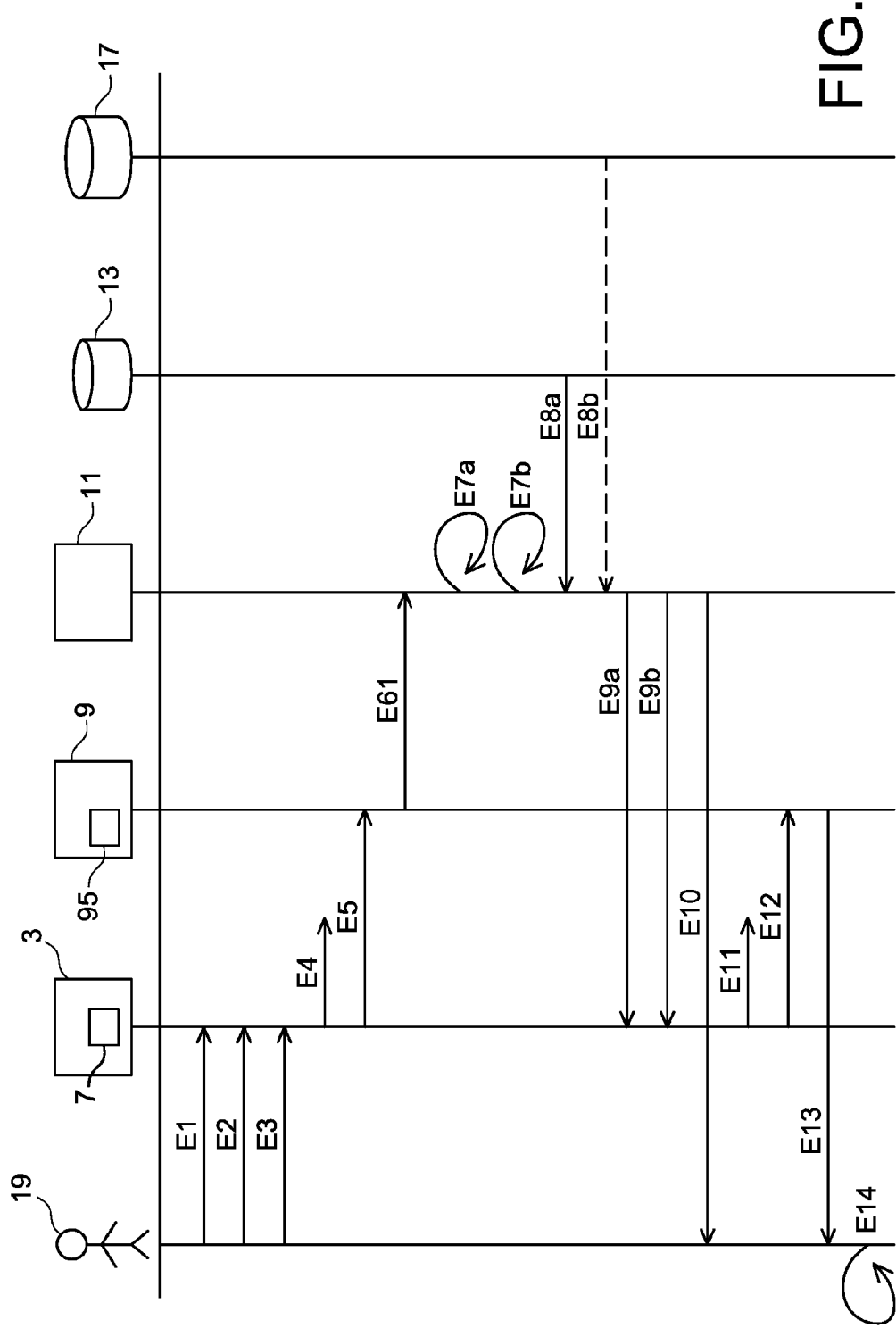
FIG. 3 schematically illustrates an example of a method for automatically reloading software in an embedded unit of an aircraft, according to the first embodiment of the disclosure herein.

FIG. 3 schematically illustrates an example of a method for automatically reloading software in an embedded unit of an aircraft, according to this first embodiment of the disclosure herein.

In the step E1, a maintenance operator 19 removes a defective embedded unit 3 after the aircraft 5 has landed. By way of example, the unit has been previously detected as defective during the flight by an embedded monitoring system (not represented) and a message has been sent to the ground for the replacement of the unit with a new unit.

In the step E2, the maintenance operator 19 installs the new unit 3, procured before the landing of the aircraft 5, in its corresponding receptacle 21 in place of the defective unit which has been removed in the step E1.

In the step E3, the maintenance operator 19 restores the electrical power supply for the new unit 3.

In the step E4, the new unit 3 begins to periodically transmit a configuration frame 23 LRU CONF FRAME comprising a set of identifiers in the form of triplets for the hardware identifiers and pairs for the software identifiers. For example, the configuration frame comprises a hardware identifier FIN_HW associated with a new part number PNR_HW_NEW and a new serial number SNR_HW_NEW and each of the N software identifiers FIN_SW1, . . . , FIN_SWN is associated with a new software part number PNR_SW1_NEW, . . . , PNR_ SWN_NEW. The configuration frame can then take the following form:

[FIN_HW=PNR_HW_NEW & SNR_HW_NEW],
[FIN_SW1=PNR_SW1_NEW], . . . , [FIN_SWN=PNR_SWN_NEW].

In the step E5, the detector 9 acquires the configuration frame LRU CONF FRAME, extracts each identifier (pair/triplet) and updates the values of the hardware and software identifiers PNR/SNR in an internal log table 95 which comprises a line or position for each part number. Then, the detector 9 compares each of the hardware identifiers PNR_HW_NEW & SNR_HW_NEW and software identifiers PNR_SW1_NEW, . . . , PNR_SWN_NEW of the current frame to each of the corresponding hardware identifiers PNR_HW_OLD & SNR_HW_OLD and software identifiers PNR_SW1_OLD, . . . , PNR_SWN_OLD already stored on the last line of the internal table 95 and associated with the preceding unit. In particular, it is assumed that, according to this example, the defective unit has been replaced by a standard or equivalent new unit 3. Then, the hardware serial number SNR of the new unit is different from that of the preceding unit but the hardware part number PNR does not change. Moreover, it is assumed that at least one element of the software identifiers FIN_SW hosted by the new unit is different from that hosted by the removed unit. Thus, the detector 9 detects a change of hardware SNR and software FIN_SW configuration of the unit 3 and determines the software elements which have to be reloaded in the new unit.

In the step E6, the detector 9 transmits to the software loader 11 a trigger signal indicating, for example, the preceding and current configurations of the unit thus signalling to them the software elements which have to be reloaded in the unit 3. In particular, it signals to the software loader 11 that the software identifiers FIN_SW1 . . . FIN_SWN of the equipment referred to by the hardware identifier [FIN_HW=PNR_HW_NEW & SNR_HW_NEW] have to be loaded with software elements PNR_SW1_OLD, . . . , PNR_SWN_OLD associated with the preceding unit equipped with a same hardware part number PNR_HW_NEW=PNR_HW_OLD.

In the case where the unit 3 does not need to be downloaded in any particular order, then the next step will be the step E7a. On the other hand, in the case where the unit 3 needs to be downloaded in a well determined order, then the next step will be the step E7b.

In the step E7a, the software loader 11 knows that the unit FIN_HW affected by the loading is capable of downloading the software element or elements SW in any order and that no software element other than those indicated by the detector 9 needs to be reloaded in the unit 3, the latter being itself adapted to reorganize the set of downloaded software elements in an appropriate loading order. Thus, the software loader 11 can reload, in the step E7a, the set of software elements into the unit 3 without any concern for the order of loading.

In the step E7b, the software loader 11 is adapted to store the order in which the set of software elements must be reloaded in the unit 3. In effect, the software loader 11 determines which software identifiers FIN_SW are affected and uses models (templates, "LRU RESTORE PATTERN") previously recorded in a dedicated memory. This kind of model is described in the patent application FR1352194 co-owned herewith.

In the case where the software loader 11 notices that there is a certain software reference SWX_PNR missing, then it asks the detector 9 to supply it with the missing information. The latter then returns the corresponding value PNR_SWX_OLD to the software loader 11 which in turn acknowledges receipt. Thus, the software loader 11 can reload, in the step E7b, the set of software elements in the unit 3.

In the step E8a or E8b, the software loader 11 recovers the software elements that have to be reloaded in the unit 3.

It will be noted that, in the case where the aircraft 5 comprises an embedded storage device or space 13 (repository) in which all the software of the embedded units is stored, then the software loader 11 recovers, for each of the software constants, the software elements (or software parts) that have to be reloaded in the unit 3 (step E8a).

On the other hand, in the case where the aircraft 5 does not comprise an embedded storage space, then the software loader 11 uses the communication devices 15 of the aircraft to send requests to a service 17 on the ground, FLSGR (field loadable software repository), in order to recover copies of all the missing software elements that have to be loaded in the unit 3 and acknowledges reception after reception of these copies (step E8b).

In the step E9a or E9b, the software loader 11 reloads the set of software elements in the targeted unit 3 being guided if necessary by the "LRU RESTORE PATTERN" templates.

More particularly, in the step E9a, the software loader 11 constructs a list of elements to be loaded from the elements established in the step E7a and recovered in the step E8a or E8b.

In the step E9b, the software loader 11 recovers the "LRU RESTORE PATTERN" templates associated with the FIN_HW, and updates them with the elements established in the step E7b and recovered in the step E8a or E8b. Then, the software loader 11 executes the "LRU RESTORE PATTERN" template step by step according to an electronic Service Bulletin eSB. The step-by-step execution is notably described in the patent application FR1352194 from the applicant.

In the step E10, the software loader 11 transmits a notification to the maintenance operator 19 indicating to him or her that the automatic reloading operation is finished.

In the step E11, the unit 3 restarts automatically and recommences periodically transmitting a new configuration frame LRU CONF FRAME comprising the new hardware and/or software configuration identifiers for example in the following form:

[FIN_HW=PNR_HW_NEW & SNR_HW_NEW], [FIN_SW1=PNR_SW1_OLD], . . . , [FIN_SWN= PNR_SWN_OLD].

In step E12, the detector 9 captures the new configuration frame LRU CONF FRAME and compares each PNR/SNR value of the current frame (i.e. received last) with the corresponding values of the preceding frame stored previously in order to check that the targeted unit 3 comprises the desired configuration.

In step E12, the detector 9 checks that the targeted unit 3 has been restored or reconfigured according to the appropriate hardware and/or software configuration of the removed unit. The detector 9 then validates this new configuration and all the new elements are stored in the first line of the internal log table by shifting all the other lines (i.e., the line N is shifted to N−1, the line N−1 to N−2 and the line N−2 is lost).

In step E13, the detector 9 transmits to the maintenance operator 19 the new configuration of the unit in order for the latter to be able to close his or her jobcard. As a variant, the new configuration is sent to an application for automatically filling out the jobcards.

In step E14, the jobcard is closed by the maintenance operator 19 or by the automatic filling-out application.

Figure 4:
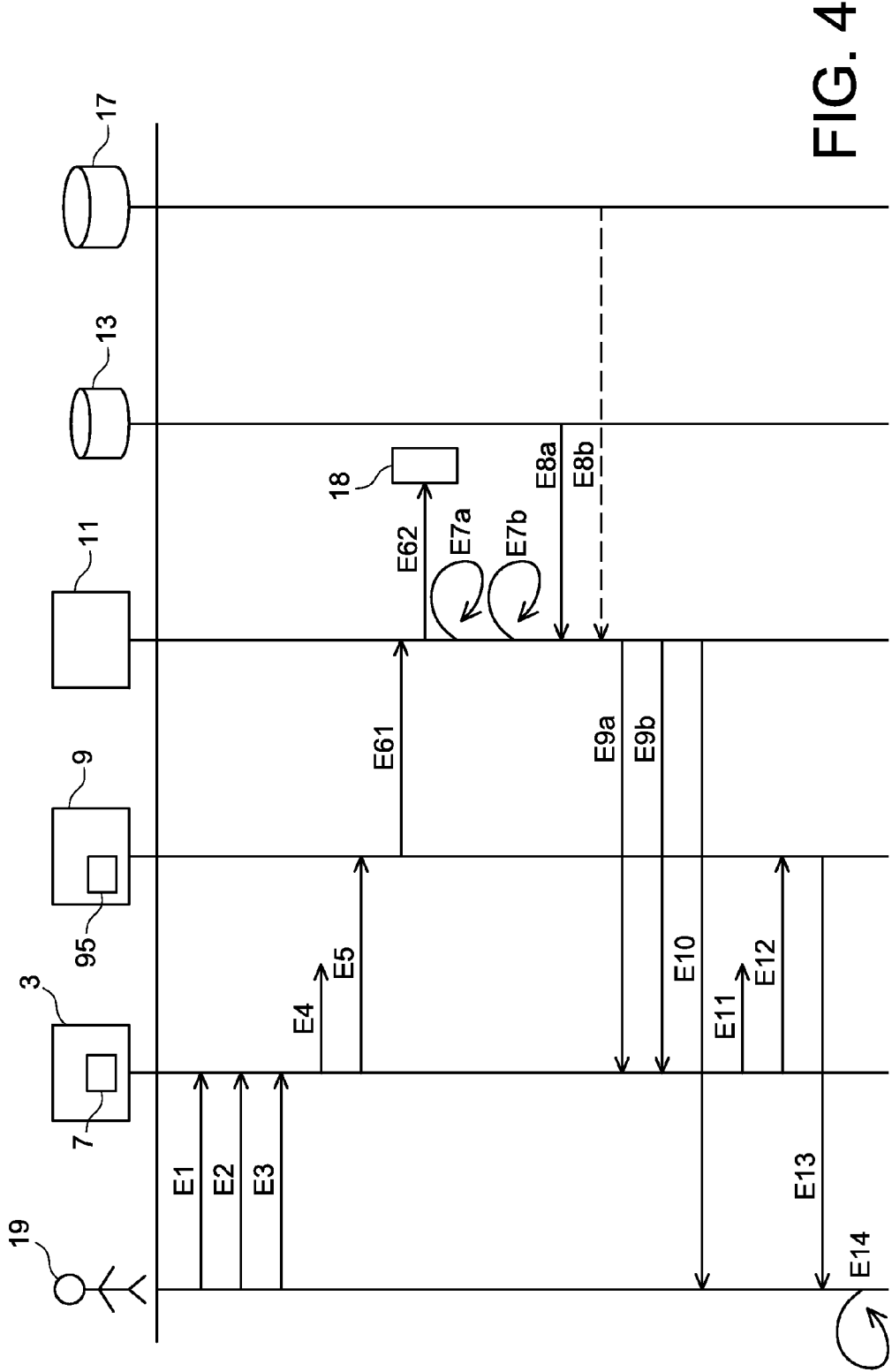
FIG. 4 schematically illustrates another example of a method for automatically reloading software in an embedded unit of an aircraft, according to the first embodiment of the disclosure herein.

FIG. 4 schematically illustrates another example of a method for automatically reloading software in an embedded unit of an aircraft, according to the first embodiment of the disclosure herein.

According to this example, it is assumed that the defective unit has been replaced by a non-standard new unit. In this case, the hardware serial number SNR and the hardware part number PNR of the new unit are different from those of the preceding unit.

Steps E1 to E5 and E7a to E13 are identical to those of FIG. 3. As previously, it is also assumed that at least one element of the software identifiers FIN_SW hosted by the new unit 3 is different from that hosted by the removed unit. Thus, the detector 9 detects a change of hardware SNR and software FIN_SW configuration of the unit.

In step E61, the detector 9 transmits to the software loader 11 a trigger signal indicating that it has to reload all the software elements FIN_SW1 . . . FIN_SWN in a unit having a new hardware identifier and that the list of these software elements has to be procured.

In step E62, the software loader 11 sends a request to a service 18 on the ground to procure the list of the software part numbers that have to be installed on the new unit 3 equipped with a new hardware part number SNR_HW_NEW. Once it has the list of the new software part numbers, it acknowledges reception and recovers, as previously, the set of software elements either from the embedded storage device 13 (step E8a) or from the FLSGR service 17 (step E8b).

Figure 5:
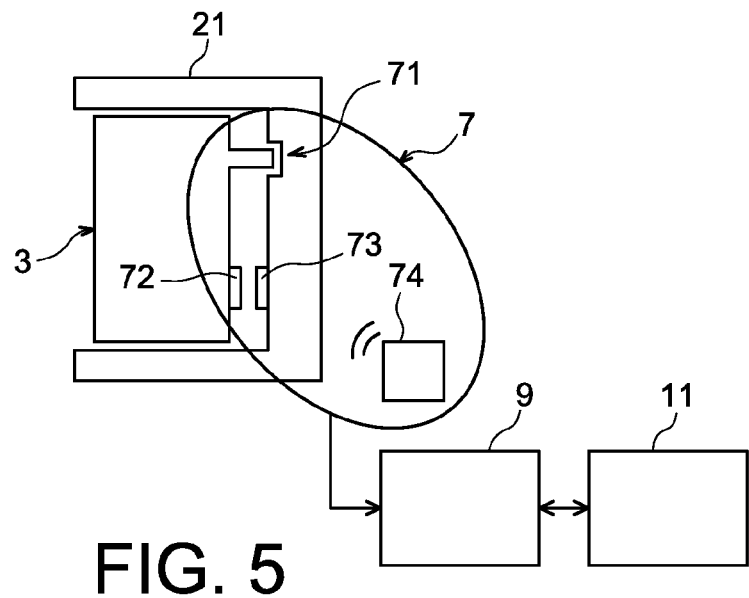
FIG. 5 schematically illustrates a system for automatically reloading software in an embedded unit of an aircraft, according to a second preferred embodiment of the disclosure herein.

FIG. 5 schematically illustrates a system for automatically reloading software into an embedded unit of an aircraft, according to a second preferred embodiment of the disclosure herein.

This second embodiment applies in the case where the unit 3 is not adapted to itself transmit configuration frames. In this case, the unit 3 is coupled to a transmitter 7 comprising a connection detector 71, a first RFID tag 72 tagging the unit 3, a second RFID tag 73 tagging the receptacle 21 associated with the unit 3, and a management device or an RFID controller 74. An RFID management procedure is described in the French patent application FR1353448 from the applicant.

The connection detector 71 is adapted to detect a reconnection of the unit 3 in a corresponding receptacle 21 of the aircraft and to transmit a reconnection signal when the unit has been connected in its receptacle. This mechanism comprises an electrical circuit provided with a switch which is tripped when the unit is installed in its receptacle, changing the open or closed state of the circuit.

Figure 6A:
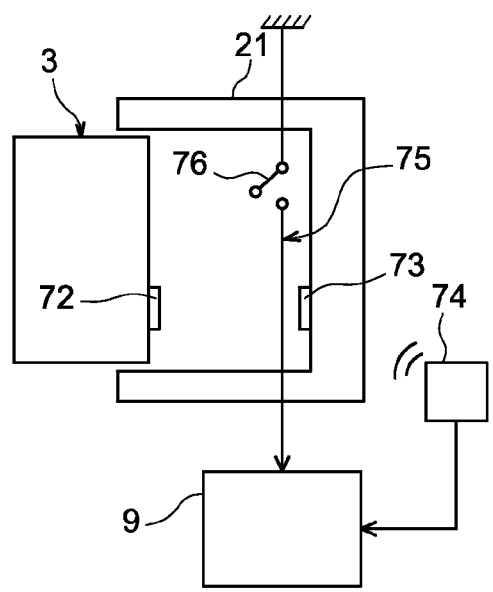
FIGS. 6A and 6B schematically illustrate two variants of a connection mechanism according to the second embodiment of the disclosure herein.

FIG. 6A is an example of this kind of mechanism 71 showing an electrical circuit 75 comprising a switch 76 arranged at the back of the receptacle 21. The circuit 75 is linked by wire or wirelessly to the detector 9 or to the RFID controller 74. The switch 76 is actuated by the insertion of the unit 3 into its receptacle 21 thus closing the electrical circuit 75 which then transmits a binary signal to the detector 9 and/or to the RFID controller 74.

Figure 6B:
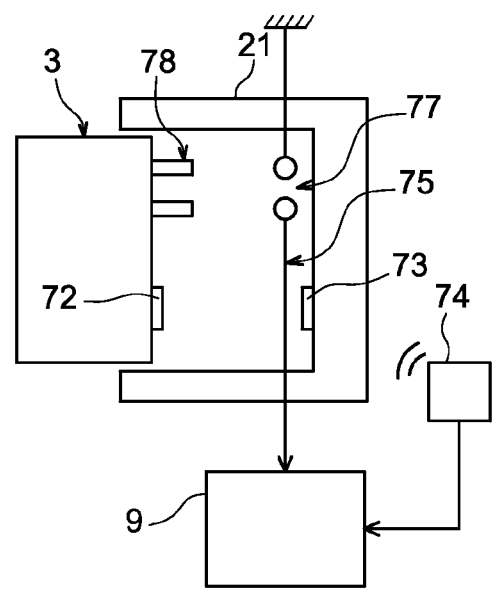

FIG. 6B is another example of the connection detector also showing an electrical circuit 75 linked by wire or wirelessly to the detector 9 and/or to the RFID controller 74 and provided with a socket 77 arranged at the back of the receptacle 21. The rear of the unit 3 is equipped with pins 78 which are fitted into the socket 77 by the insertion of the unit 3 into its receptacle 21 thus closing the electrical circuit 75 which then transmits a binary signal to the detector 9 and/or RFID controller 74.

The first RFID tag 72 is a radio tag fixed for example by bonding onto the unit 3 with which it is associated. The first RFID tag 72 comprises first identifiers of the hardware configuration PNR_HW & SNR_HW and possibly software configurations of the unit 3.

The second RFID tag 73 is fixed for example by bonding onto the receptacle 21 with which it is associated and is coupled to the first RFID tag 72. The second RFID tag 73 comprises second hardware identifiers FIN_HW of the unit 3 which has to be installed in this receptacle 21. The information contained in the first 72 and second 73 tags are at least sufficient to allow an appropriate reloading of the unit 3.

The RFID controller 74 is installed on board the aircraft 5. After the reconnection of the unit 3, the RFID controller 74 is adapted to interrogate the first RFID tag 72 tagging this unit 3. In response to the request from the RFID controller 74, the first RFID tag 72 is adapted to transmit thereto the data from the second RFID tag 73 to which it is coupled and the data from the first RFID tag 72 itself. Thus, the RFID controller 74 is adapted to recover the first and second configuration identifiers recorded in the first and second RFID tags. Furthermore, the RFID controller 74 is adapted to transmit a configuration frame comprising these first and second configuration identifiers of the unit to the detector 9.

FIG. 7 schematically illustrates an example of a method for automatically reloading software in an embedded unit of an aircraft, according to the second preferred embodiment of the disclosure herein.

This method is identical to that of FIG. 3 or of FIG. 4 apart from the step E4 which is replaced by the steps E41 to E44.

Steps E1 to E3 relate to the replacement of a defective unit with a new unit or the installation of the same unit after repair.

In step E41, after the installation of a new unit 3 or of the same unit repaired in its receptacle 21, a reconnection signal is transmitted by the connection detector 71.

In step E42, the detector 9 receives the reconnection signal from the connection mechanism 71 indicating that the unit 3 has been connected in its receptacle 21. The detector 9 consequently asks the RFID controller 74 to transmit to it the configuration identifiers of the unit.

In step E43, the RFID controller 74 excites the first tag 72 which returns thereto (step E44) the data from the second RFID tag 73 to which it is coupled as well as the data from the first RFID tag 72 itself. Thus, the RFID controller 74 recovers the hardware identifiers FIN_HW from the second tag 73 and the hardware identifiers PNR_HW & SNR_HW (and possibly software identifiers) from the first tag 72.

In step E45, the RFID controller 74 transmits a configuration frame comprising the hardware and possibly software configuration identifiers of the unit to the detector 9. Then, the steps are identical to the steps E5 to E14 of FIG. 3 or FIG. 4.

Thus, the present disclosure makes it possible to automatically detect a change of configuration of an embedded unit (signifying that the latter has been removed then reinstalled on the aircraft) and to automatically reload the appropriate software configuration in the unit.

The subject matter disclosed herein can be implemented at least partially in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically reloading software in an embedded and replaceable unit of an aircraft, the method comprising:
transmitting, using a transmitter stored in a memory and associated with the unit, a configuration frame comprising a set of identifiers of current hardware and/or software configuration of the unit, the unit being reinstalled on the aircraft after having been removed and repaired or being a new unit installed on the aircraft to replace a previously removed defective unit;
wherein the transmitter comprises:
a connection detector that detects a reconnection of the unit in a corresponding receptacle of the aircraft, in which the connection detector comprises a switch that trips when the unit is installed in the receptacle;
a first RFID tag tagging the unit and comprising first configuration identifiers;
a second RFID tag tagging the receptacle of the unit and comprising second configuration identifiers; and
an RFID controller adapted to recover the first and second configuration identifiers from the first and second RFID tags, respectively, after detection of the reconnection of the unit and to transmit a configuration frame comprising the current configuration identifiers of the unit on a date of reconnection in the receptacle;
capturing the configuration frame and detection of a change of hardware and/or software configuration of the unit; and
automatically reloading a set of appropriate software elements in the unit according to the detected change of configuration.

2. A system for automatically reloading software in an embedded and replaceable unit of an aircraft, the system comprising:
a transmitter stored in a memory and associated with the unit, wherein:
the transmitter is adapted to transmit a configuration frame comprising a set of identifiers of current hardware and/or software configuration of the unit, the unit being reinstalled on the aircraft after having been removed and repaired or being a new unit installed on the aircraft to replace a previously removed defective unit;
wherein the transmitter comprises:
a connection detector adapted to detect a reconnection of the unit in a corresponding receptacle of the aircraft, in which the connection detector comprises a switch which is tripped when the unit is installed in the receptacle;
a first RFID tag tagging the unit and comprising first configuration identifiers;
a second RFID tag tagging the receptacle of the unit and comprising second configuration identifiers; and
an RFID controller adapted to recover the first and second configuration identifiers from the first and second RFID tags, respectively, after detection of the reconnection of the unit and to transmit a configuration frame that comprises the current configuration identifiers of the unit on a date of reconnection in the receptacle;
a detector stored in a memory and adapted to capture the configuration frame and to detect a change of hardware and/or software configuration of the unit; and
a software loader stored in a memory and adapted to automatically reload a set of appropriate software elements in the unit according to a detected change of configuration.

3. The system according to claim 2, wherein the detector comprises:
a receiver adapted to capture the configuration frame;
a comparator adapted to compare the identifiers of the current hardware and/or software configuration of the unit with the identifiers of a preceding configuration in order to detect any change of hardware and/or software configuration of the unit;

a trigger adapted to transmit to the software loader a trigger signal in order to trigger downloading of the set of appropriate software elements into the unit according to a detected change of configuration; and a recorder adapted to record the identifiers of the current configuration.

4. The system according to claim 2, wherein the transmitter is incorporated in the unit and is adapted to transmit, on successive dates, a series of configuration frames, each frame comprising, on the date of transmission, a set of identifiers of a current hardware and/or software configuration of the unit.

5. The system according to claim 2, further comprising an embedded software storage device, the software loader being further adapted to recover the set of appropriate software elements from the embedded software storage device.

6. The system according to claim 2, wherein the software loader is further adapted to recover, via communication devices, the set of appropriate software elements from a software storage device arranged external to the aircraft.

7. The system according to claim 2, wherein the detector is further adapted to check that the unit comprises an appropriate configuration and to perform a validation and a logging of a new configuration.

8. An aircraft comprising at least one reloading system according to claim 2.

\* \* \* \* \*